Nov. 29, 1932.   R. D. HICKOK   1,889,361
ELECTRICAL MEASURING INSTRUMENT
Filed Oct. 24, 1927
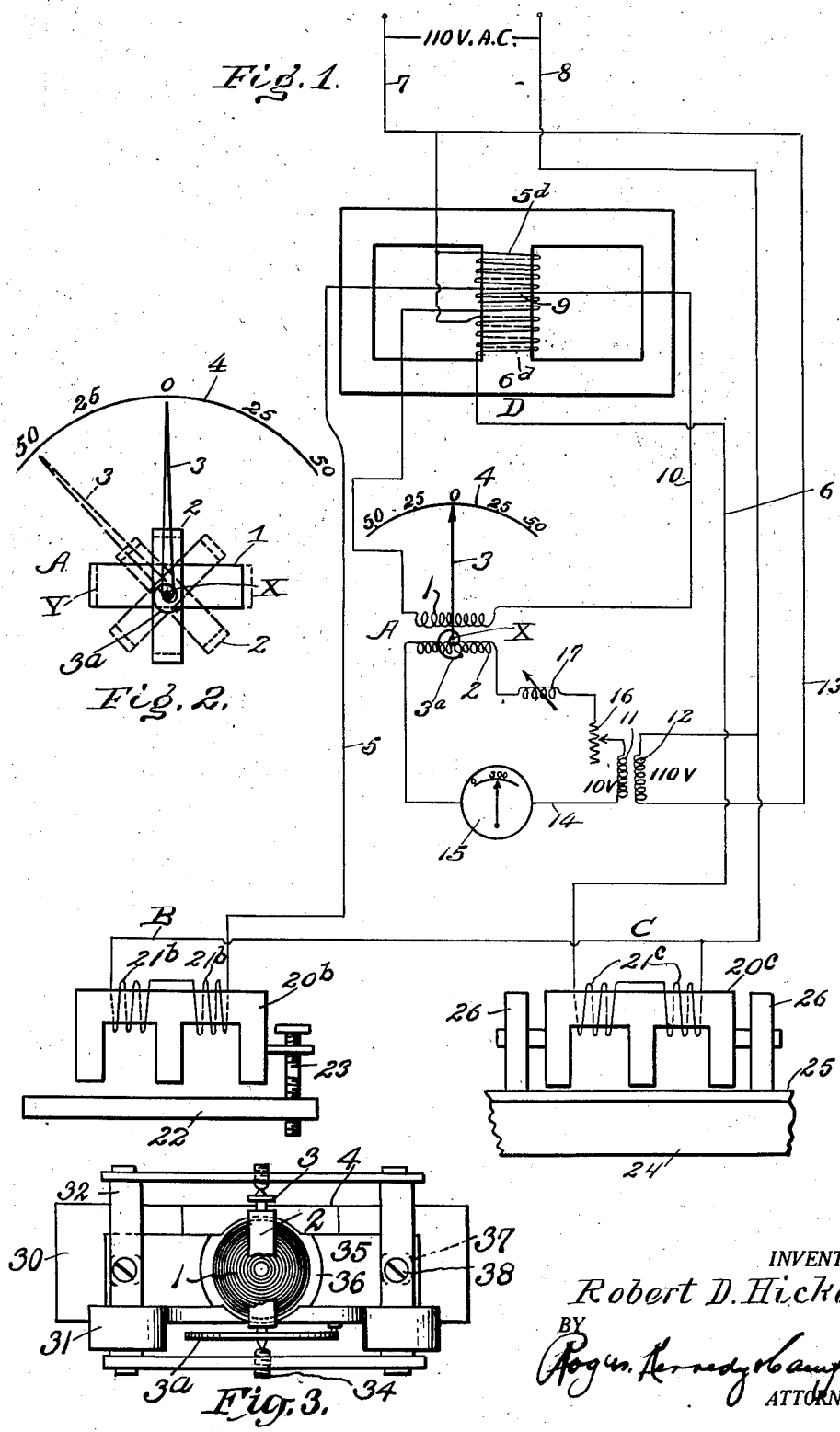
INVENTOR.
Robert D. Hickok
BY
ATTORNEYS Patented Nov. 29, 1932

1,889,361

UNITED STATES PATENT OFFICE

ROBERT D. HICKOK, OF CLEVELAND, OHIO, ASSIGNOR TO THE MAGNETIC GAUGE COMPANY, OF AKRON, OHIO, A CORPORATION OF OHIO

ELECTRICAL MEASURING INSTRUMENT

Application filed October 24, 1927. Serial No. 228,404.

This invention is a novel electrical measuring instrument, and relates more particularly to a milliammeter employed for example for measuring minute variations in alternating currents or the relative variations or differences in the currents flowing in two circuits.

The main object of the invention is to provide a highly sensitive instrument of the kind referred to, and one capable of affording a direct reading of the difference in currents in two circuits, and adapted for calibration in terms of the difference in the currents, or of any other quality or condition of which the difference in current is a function or factor, and which instrument is electrically controlled and operated and is capable of a wide variety of uses in the industrial arts. Other and further objects and advantages of the present invention will be pointed out in the hereinafter following description of an illustrative embodiment thereof or will be understood to those conversant with the subject. To the attainment of such objects and advantages the present invention consists in the novel electrical measuring instrument or alternating current milliammeter, and the novel features of operation, combination, arrangement and detail herein illustrated or described.

In the drawing, Fig. 1 is a diagram illustrating one practical application of the invention; and Fig. 2 is a detail view, somewhat diagrammatic, illustrating an electrodynamometer forming a part of the apparatus. Fig. 3 is a front elevation of the electrodynamometer, considering Fig. 2 as a top view, Fig. 3 broken away to show the interior construction and embodying also means for relative adjustment.

The present invention as herein illustrated provides an instrument or apparatus adapted particularly for connection to two circuits supplied from a common source, and connected to such circuits by any suitable means, either mechanical or electrical, in such a manner that variation in the flow in the two circuits actuates the movable pointer of a suitable indicating instrument, such as an electrodynamometer. Such an instrument is generally indicated at A, and involves a relatively stationary field coil 1, and a movable coil 2 to which the indicating pointer 3 is attached, causing the same to move over a scale 4. To the pointer are connected the restoring hair springs 3a which produce the necessary restoring torque to return it to the central or zero position, and which may also form the current leads, and will operate as hereinbelow described.

Considering Fig. 2 as a top plan view, with the index pointer 3 extending horizontally from the axis of coil 2, Fig. 3 represents a front elevation of the same parts shown in a more complete and practical embodiment. A frame part or base 30 is shown as having brackets 31 extending forwardly therefrom. These brackets give support to a square frame comprising end bars 32 and side bars 33, the side bars carrying pivots 34 by which the movable coil 2 is mounted to rotate. A longitudinal bar 35 is extended frontwardly in the form of a sleeve 36 narrowed at its top and bottom sides to be accommodated within the outline of the coil 2. The bar 35 is adjustably longitudinally, being formed with end slots 37 attached by screws 38 to the upright bars 32, the loosening of the screws permitting the bar 35 and the stationary field coil 1 to be adjusted horizontally relatively to the movable coil 2.

According to the present embodiment of the invention the effect of the difference in flow through the two circuits is applied to one of said dynamometer coils, and the current in the other coil may be adjusted to proper conditions to produce the desired result.

Referring to Fig. 1, the two circuits, marked 5 and 6, whose difference in current is to be measured, are supplied from the same leads or mains 7, 8, which may be any source of alternating current voltage, say 110 volts. These two circuits 5, 6, supply energy to any two devices, such as the instruments B, C, which, for the present, we may assume demand or use slightly different currents, with the desirability for accurately measuring the difference between said currents. The instruments B and C will be later described.

Suitable means is provided for subjecting one of the coils of the electrodynamometer, such as field coil 1, to the influence of the difference in value of the currents in circuit 5, 6, such for example as the differential transformer D, upon one pole of the core of which are wound two primary coils $5^d$ and $6^d$, included respectively in the two circuits 5 and 6, with the windings of the coils of such form and so disposed as to produce opposing magnetic fields in the transformer. For example, and as shown, the two primary coils $5^d$ and $6^d$ may be wound in opposite directions upon the same pole. In the resultant differential field thereby produced is located a secondary, such as the coil 9, in a closed circuit 10 with the field coil 1 of the electrodynamometer. Therefore, said field coil is energized constantly by a current whose value is a function of any difference, however minute, between the currents in the two circuits 5, 6. In order to secure very sensitive magnification the ratio of turns between each of the primary coils $5^d$ and $6^d$ and the secondary coil 9 is made as large as is practical. Coils $5^d$ and $6^d$ are of course alike as to their number of turns, but, for example, each of said coils may have approximately ten times as many turns as the secondary coil 9.

The currents in the two circuits 5, 6, are of course always in phase with each other and with the current in the field coil 1 energized thereby. If the current in the movable coil 2 is in phase with that in the field coil, a maximum deflection of the needle 3 will be produced under any given conditions. Means is therefore provided for insuring uniform current condition in the movable coil—a current at a value of say 300 milliamperes—, and for also enabling the current in the movable coil to be maintained in or adjusted into phase with the current in the field coil 1. The means shown for the purpose includes means for energizing the movable coil from the same source, to wit, leads 7, 8, which energize the circuits 5, 6, together with means for adjusting the phase relation of coil 2 to coil 1. As shown, the movable coil 2 is energized by the secondary 11 of a transformer, the primary 12 of which is in a circuit 13 connecting to the leads 7, 8. The secondary 11 is in a closed circuit 14 including the coil 2, a milliammeter 15, an adjustable resistance 16 and a variable reactance 17.

Assuming that circuits 5 and 6 are energized the field coil 1 is subjected by the transformer D to a current having a value proportional to any difference in current between circuits 5 and 6. The current in circuit 14 and coil 2, by proper adjustment of the resistance 16 and reactance 17, may be maintained at any desired definite value, say 300 milliamperes, as indicated on the milliammeter 15, and at the same time the phase relation of circuit 14 to the circuit 10 may be varied until the phases of the coils 2 and 1 are the same. In this condition maximum deflection of the pointer 3 is attained, and its deflected position will be a direct function of the difference in current between circuits 5 and 6.

Let it be assumed that owing to a difference in resistance or reactance in circuits 5 and 6, the current in circuit 5 is 1.0 ampere and in circuit 6 is 1.1 ampere. Owing to the fact that the two primary coils $3^d$ and $6^d$ of transformer D produce magnetic fields which are reversed or opposed to each other a magnetic flux is produced in the iron core of the transformer proportional to the difference in the two currents, to wit, to 0.1 of an ampere, and the magnified effect of this flux is produced in coil 1 at a value proportional to the differential. Circuit 14 being energized by connection of the primary circuit 13 to the original source of current 7, 8, the resistance 16 and reactance 17 are preferably adjusted, first to produce a reading on the milliammeter 15 of the chosen standard condition, say 300 milliamperes, whereupon the resistance and reactance are further adjusted to maintain such current value and secure maximum deflection of the pointer 3. This pointer will then indicate by its position the difference in value between the two currents in circuits 5 and 6.

The scale of the electrodynamometer A may be calibrated in absolute units, such as in amperes, milliamperes, or the like, or, when the difference in current in the two circuits is a function of some particular quality or condition in said circuits 5, 6, or of instruments or devices connected thereto, the scale can be calibrated in terms of said quality or condition.

The invention may be used for various purposes and is available in any case wherein varying currents flow through two parallel circuits to different devices, such as two electric lamps, two electric motors, or other translating devices.

One practical application of the invention is for progressively measuring or indicating or determining the thickness or variations in thickness of rubber or other stock or sheet material passed between the rolls or elements of a calender or other press in the process of rolling the same to a desired definite thickness. Such an arrangement is shown in the drawing, the instrument B being a standard or master instrument adjustable to any desired condition and the instrument C being a like or parallel instrument subjected to variations in thickness of the stock for the purpose of comparing it with the standard by measurement of the difference in value of the currents supplied to the two instruments B, C. The two instruments may be alike in essential respects. They are both of electromagnetic character including magnet cores $20^b$ and $20^c$, and a coil or coils $21^b$ and $21^c$ wound thereon and included respectively in the circuits 5 or 6. The standard instrument B comprises an iron armature 22 provided with means, such as the screw 23, for adjusting the gap between said armature and the poles or core 20ᵇ. Instrument C is analogous, but its armature is formed by the iron of member 24, which may be the bed or platen or calender roll of the rolling or other mill through which the sheet of rubber material 25 is passed to sqeeeze it to proper thickness, and the core 20ᶜ is provided with rollers 26 bearing or held by gravity or otherwise against the rubber sheet 25, so that the width of gap or space between magnet core 20ᶜ and armature 24 is determined by and is varied in accordance with the thickness of the rubber sheet 25.

In using such apparatus the standard instrument or master magnet B is initially adjusted by its screw 23 to produce a gap which experience or test shows will correspond with a desired thickness of rubber passing between the armature and core of the second or gaging instrument or magnet C. The latter instrument C may be continuously held to the work in the manner shown, and the two instruments B and C may be connected up in the circuits and to the indicating instrument of this invention in the manner shown in Fig. 1. At any time, even while the work is passing through the mill, the resistance 16 and reactance 17 can be adjusted, as desired, to produce upon the electrodynamometer an indication of the difference in current flowing in the two circuits 5 and 6. This difference in current is due to difference in the reactances in the two electromagnets B and C as the result of varying gaps therein. When the core is close to the armature the reactance is high and when it is remote the reactance is low, with a considerable variation in current flow in the circuit to the instrument for fairly minute variations in the gap. In actual practice it has been found that a difference of .015 amperes in current flow in the two circuits 5, 6 can be made to produce deflection of the indicating pointer 3 of 45° to either side of the center.

The instrument is preferably provided with a special form of electrodynamometer for the following reasons. The usual electrodynamometer has a scale, the divisions of which vary in size from end to end, due among other things to the fact that the force tending to produce parallelism of the coils varies inversely as the squares of the distance between them in their various positions. The present instrument is designed to indicate differences and not absolute values of current, but the difference between two currents of low absolute value obviously produces less movement of the pointer of an ordinary electrodynamometer than the same difference between two currents of higher value. While in some cases the instrument might be useful with an ordinary electrodynamometer it preferably should include one whose pointer travels over uniform distances for uniform variations in current throughout its entire range of movement. I have already designed, built and demonstrated electrodynamometers which satisfy the required conditions. Such an instrument is more or less diagrammatically shown in Fig. 2, and constructionally in Fig. 3.

Stationary or field coil 1 is a solid coil wound tightly from its center to its periphery. The moving coil 2 is a light annulus embracing coil 1 and mounted to turn on an axis X, its total movement being limited by its engagement with suitable stops or with a part of the stationary coil to approximately 90°. In constructing this instrument with the uniform scale described, it has been found from investigation and by repeated tests that the required results are obtained when the coils have certain definite physical dimensions and relations to each other and are provided with the necessary relative adjustments to enable their magnetic fields to be centered about the same axis with reference to each other. A number of factors enter into the problem, but, for example, it has been found that the length of coil 1—its dimensions lengthwise of its axis—must be approximately 35% of the diameter of coil 2. This ratio may vary within about 5%, plus or minus, but hardly more than that. Coil 2 is of course a light coil and its inner and outer diameters differ by about $\frac{1}{16}''$. Coil 2 may have a diameter about $1\frac{1}{16}''$, and coil 1 a diameter of about $1\frac{5}{16}''$. One of the coils, such as coil 1, may be bodily adjustable along its own plane, as indicated by the dotted lines Y, Fig. 2, so as to enable the magnetic fields to be centered. Usually also the axis X is nearer to one face of the coil 1 than to the other, and in Fig. 2 is shown as nearer to its front face, shown at the bottom. Also, said axis is offset to one side of the diameter of coil 2, or so that there is more of coil 2 on one side of the axis than on the other. This out of balance condition of the coil 2 helps to counterbalance the weight of the indicating pointer, for example.

The electrodynamometer hereof may be considered as substantially governed by the restoring springs 3ᵃ, which not merely tend to return the movable coil and pointer to zero position, but to present an opposing torque of a variable or increasing character such that when a given current difference develops an electrical torque between the coils the movable coil will rotate to such a degree or position that the electrical torque balances the opposing torque of the springs. This arrangement is such that equal increments of current difference will cause equal displacements of the movable coil and pointer.

Taking all these factors into consideration it is possible to construct an electrodynamometer in which, throughout the range of movement of the indicating pointer on either side of the central zero position, uniform variations in current produce uniform movements of the pointer. As before stated, I have already demonstrated such instruments, and in the present indicating system such an instrument does away with any necessity for considering the absolute value of the current, and the electrodynamometer merely indicates the values of differences in current. As a result it is possible in the example shown in Fig. 1, to calibrate and mark the electrodynamometer in terms of the thickness of material passing through the instrument C.

No claim is herein made per se to an apparatus for measuring or regulating the thickness or other dimension of sheet or other material which comprises gaging magnet C or master magnet B or their equivalents, or the combination of them with each other or with a differential transformer and milliammeter, generally speaking, as these elements are the subject of application filed by Paul B. Schuster, on October 22, 1927, Serial No. 228,045.

There has thus been described an electrical measuring instrument embodying the principles and attaining the objects of the present invention. Since various matters of operation, combination, arrangement, construction and detail may be modified without departing from the underlying principles it is not intended to limit the invention to such matters except so far as specified in the appended claims.

What is claimed is:

1. Apparatus for measuring the value of a resultant electric current representing the difference in alternating currents flowing through two circuits, comprising an indicating dynamometer having fixed and movable coils, one energized by such resultant current and the other independently from the same course, the fixed coil having its windings continued substantially to its center, and the movable coil being a light annulus embracing the fixed coil, and one of them having means for adjusting it along its own plane to center the magnetic fields of the coils.

2. Apparatus for measuring the value of a resultant electric current representing the difference in alternating currents flowing through two circuits, comprising an indicating dynamometer having fixed and movable coils, one energized by such resultant current and the other independently from the same source, the fixed coil having its windings continued substantially to its center, and the movable coil being a light annulus embracing the fixed coil, and the coils having their magnetic fields centered about the same axis.

3. Apparatus as in claim 2 and wherein the axial length of the fixed coil is approximately one third of the diameter of the movable coil.

4. Apparatus as in claim 2 and wherein the axis of rotation of the movable coil is unsymmetrically positioned with respect to both coils.

5. Apparatus as in claim 2 and wherein the axis of rotation of the movable coil is unsymmetrically positioned with respect to the fixed coil.

6. Apparatus as in claim 2 and wherein the axis of rotation of the movable coil is unsymmetrically positioned with respect to the movable coil.

7. Apparatus for measuring variations in an alternating electric current, comprising an electrodynamometer having movable and fixed coils, and a pointer operated thereby to show equal deflections for equal differences in current, said pointer connected to the movable coil; the fixed coil being wound tightly from its center to its periphery, and the movable coil being a light rotary annulus embracing the field coil; the length of the fixed coil, that is its dimension at a right angle to the plane of its windings, being approximately 30 to 40 per cent of the diameter of the movable coil, and the axis of rotation of the movable coil being offset to one side of the middle of said fixed coil.

In testimony whereof, I have affixed my signature hereto.

ROBERT D. HICKOK.